United States Patent [19]

O'Halloran et al.

[11] Patent Number: 4,896,483
[45] Date of Patent: Jan. 30, 1990

[54] HAY CONDITIONER ROLL TENSIONING MECHANISM

[75] Inventors: Michael L. O'Halloran; Martin E. Pruitt, both of Hesston, Kans.

[73] Assignee: Hay & Forage Industries, Hesston, Kans.

[21] Appl. No.: 297,945

[22] Filed: Jan. 17, 1989

[51] Int. Cl.$^4$ ............................................ A01D 82/00
[52] U.S. Cl. .................................... 56/1; 56/DIG. 1; 241/289
[58] Field of Search .............. 56/1, 192, DIG. 1, 14.4; 241/287, 289

[56] References Cited

U.S. PATENT DOCUMENTS

| | | | |
|---|---|---|---|
| 1,417,389 | 5/1922 | Krider | 241/289 X |
| 3,101,578 | 8/1963 | Johnston | 56/DIG. 1 X |
| 3,472,003 | 10/1969 | Case | 56/DIG. 1 X |
| 3,747,310 | 7/1973 | Calder | 56/1 |
| 3,797,207 | 3/1974 | Sawyer et al. | 56/1 |
| 4,035,991 | 7/1977 | Oosterling et al. | 56/DIG. 1 X |

Primary Examiner—Bruce M. Kisliuk
Assistant Examiner—David J. Bagnell
Attorney, Agent, or Firm—Hovey, Williams, Timmons & Collins

[57] ABSTRACT

In a crop conditioner having a frame and first and second rolls each rotatable about an axis of rotation, a mounting assembly for the first roll includes a sub-assembly at each end of the first roll which permit the first roll to be pivoted relative to the second roll. Each sub-assembly has a mounting plate rotatably supporting one end of the first roll and supported on the frame for pivotal movement about a pivot axis which is generally parallel to and displaced from the axis of rotation of the first roll such that the axis of rotation of the first roll is movable relative to the axis of rotation of the second roll between a first position, a second position and a third position. The second and third positions of the first roll are progressively farther away from the axis of rotation of the second roll than the first position. A biasing force is exerted on the mounting plate and the first roll which acts in a direction generally toward the second roll, the biasing force has a magnitude which is less when the first roll is located between the second and third positions than when the first roll is located between the first and second positions.

14 Claims, 2 Drawing Sheets

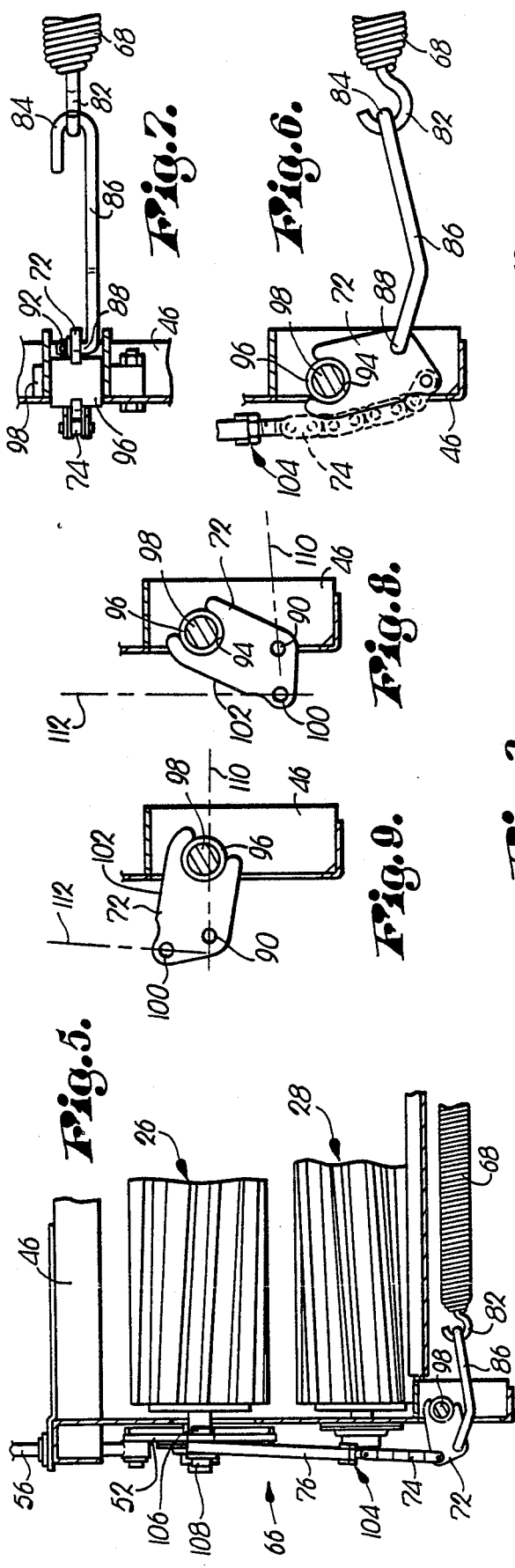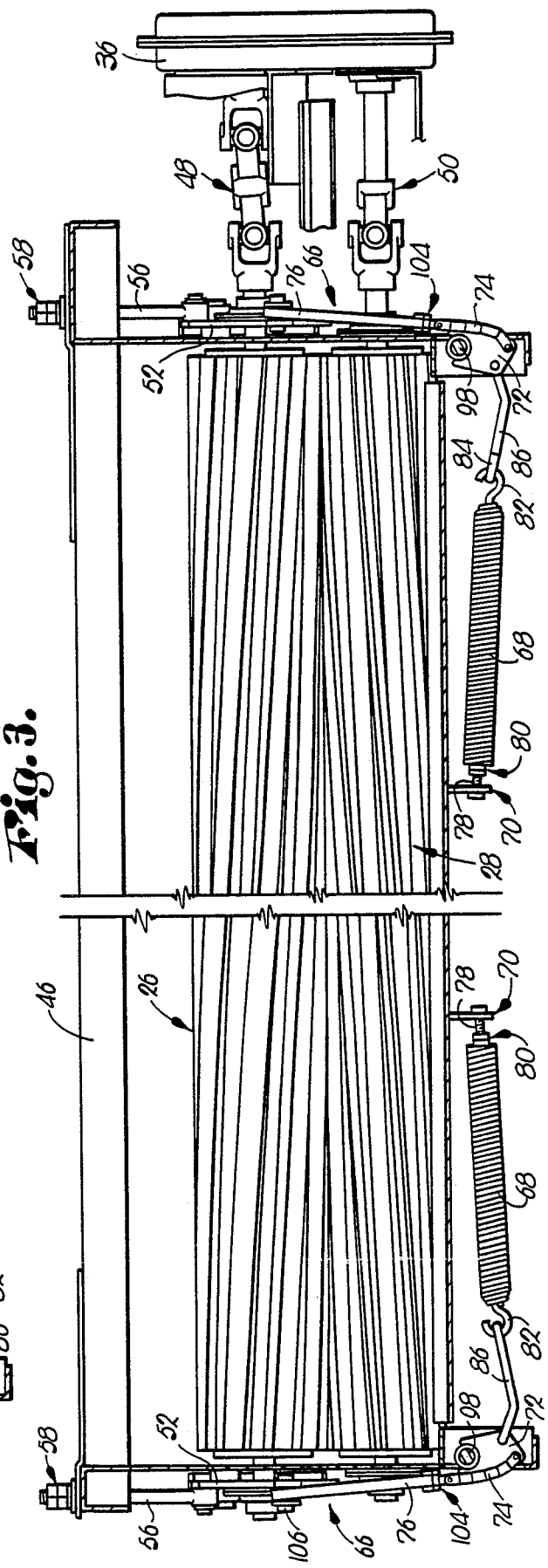

HAY CONDITIONER ROLL TENSIONING MECHANISM

BACKGROUND OF INVENTION

1. Field of the Invention

The present invention relates generally to implements for treating freshly cut crops and, more particularly, to crop conditioners for fracturing the stems of the crop to augment drying by permitting escape of fluids from the fractured stems.

2. Discussion of the Prior Art

In U.S. Pat. No. 3,472,003, a crop conditioner is disclosed which includes a first roll rotatable on a fixed axis and a second roll having ends mounted for rotation in plates that are each shiftably mounted through a four-point suspension by a pair of arms pivotally coupled to a frame member and to the plate. A pair of chains extend from the plates and are fastened to opposite ends of a spring disposed beneath the rolls for biasing the upper shiftable roll toward the lower fixed roll.

In the afore-mentioned patent, the crop conditioner is constructed to provide substantially rectilinear movement of the shiftably mounted roll while retaining a substantially uniform pressure between the rolls despite a lack of uniformity in the flow of crop material between the rolls. To this end, the spring employed in the conditioner for biasing the upper roll toward the lower roll is connected to the plates through chains so that as the plates and the upper roll move away from the lower roll, a force builds up due to the stretching of the spring that is transmitted directly to the plates. Thus, the farther apart the rolls are, the larger the biasing force urging the upper roll back toward the lower roll becomes.

In devices such as that disclosed in the afore-mentioned patent, in order to provide a biasing force that is substantially uniform over the range of movement of the upper roll, it is conventional to employ a single large spring having a spring rate of less than 35 pounds per inch and a maximum load of over 1000 pounds. By employing such a construction, the amount of variation in the biasing force of the spring over the range of motion of the upper roll is kept within a reasonable range. However, there is still some increase in spring pressure as the rolls separate.

Several problems have been found to exist in employing a crop conditioner which provides a constant or substantially constant biasing pressure of the upper or movable roll. For example, it is known that during operation of crop conditioners, oversized mats or slugs of crop material are occasionally turned up by the conditioner and pass into the gap between the two rolls. When these slugs enter the gap, they encounter only a portion of the width of the rolls and lift the upper roll from the lower roll against the biasing force so that, along the remaining length of the rolls, no conditioning occurs due to the formation of a gap which is so large relative to the thickness of the crop material passing through the gap that no conditioning occurs.

In addition, because the slugs encounter constant resistance from the upper roll, there is no release of the slug as it enters the gap and the conditioner drive mechanism may slip or stop due to the increased resistance to rotation of the rolls caused by the slug.

OBJECTS AND SUMMARY OF INVENTION

It is an object of the present invention to provide a crop conditioner in which a pair of conditioning rolls are biased toward one another during normal conditioning of crop material by a biasing force which drops off upon movement of the upper roll away from the second roll beyond a predetermined distance.

It is a further object of the present invention to provide a crop conditioner which provides rolls having ribs which are interposed during normal operation of the conditioner for fracturing the stems of the crop material in order to augment drying, and which are separated by a distance sufficient to prevent abuse of the crop material.

According to one aspect of the invention, in a crop conditioner having a frame and first and second rolls each rotatable about an axis of rotation, a mounting assembly for the first roll includes a sub-assembly at each end of the first roll. Each sub-assembly comprises a mounting plate rotatably supporting one end of the first roll and being supported on the frame for pivotal movement about a pivot axis which is generally parallel to and displaced from the axes of rotation of the rolls such that the axis of rotation of the first roll is movable relative to the axis of rotation of the second roll between a first position, a second position and a third position, with the second and third positions of the first roll being progressively farther away from the axis of rotation of the second roll than the first position. Biasing means are provided for exerting a biasing force on the mounting plate and the first roll which acts in a direction generally toward the second roll. The biasing force has a magnitude which is less when the first roll is located between the second and third positions than when the first roll is located between the first and second positions.

It is preferred that in each sub-assembly, the biasing means includes a spring for generating a spring force and force-transmitting means for transmitting the spring force to the mounting plate. Further, the force-transmitting means preferably includes force-reduction means, such as a cam plate, for reducing the force transmitted by the spring to the mounting plate as the first roll moves away from the second roll between the second and third positions.

Where a cam plate is employed as the force-reduction means, the plate preferably includes an axis of rotation and spring-connection means for connecting the cam plate to the spring at a position spaced from the axis of rotation of the cam plate so as to define a moment arm between the axis of rotation of the cam plate and the line along which the spring pulls on the cam plate. This moment arm decreases during movement of the first roll away from the second roll beyond the second position. In addition, the plate may further include means for connecting the cam plate to a chain extending between the cam plate and the mounting plate at a position on the cam spaced from the axis of rotation of the cam plate so as to define a moment arm that increases during movement of the first roll away from the second roll beyond the second position.

BRIEF DESCRIPTION OF THE DRAWING FIGURES

The preferred embodiment of the invention is described below with reference to the attached drawing figures, wherein:

FIG. 3 is a front sectional view of the crop conditioner taken along line 3—3 of FIG. 2;

FIG. 5 is an enlarged front view of the left end of FIG. 3, with the upper roll shown as being spaced from the lower roll;

FIG. 6 is an enlarged side view of the cam plate employed in the mounting assembly of the upper roll;

FIG. 7 is a top view of the cam plate of FIG. 6;

FIG. 8 is a side view of the cam plate illustrating the moment arms of the cam plate in an intermediate position of the upper roll at which a maximum force is experienced by the mounting plate;

FIG. 9 is a side view of the cam plate illustrating the moment arms of the cam plate in an extreme position of the upper roll at which a minimum force is experienced by the mounting plate.

DETAILED DESCRIPTION OF THE PREFERRED EMBODIMENT

Figure 1:
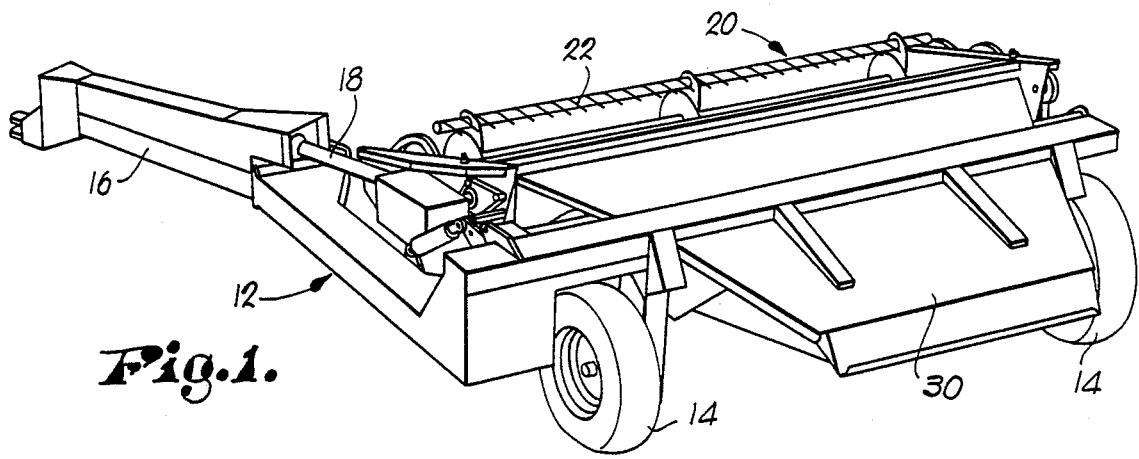
FIG. 1 is a perspective view of a crop cutting and windrowing machine in which a crop conditioner, constructed in accordance with the present invention, may be employed.

A windrowing apparatus is illustrated in FIG. 1, which employs a crop conditioning assembly constructed in accordance with the present invention. The apparatus includes a frame 12 that is supported on a pair of wheels 14 and is adapted to be pulled behind a pulling vehicle such as a tractor by a pivotable arm 16 extending forwardly of the frame 12. A drive shaft 18 also extends along the arm 16 for connection to a power take-off or similar drive output of the towing vehicle.

Figure 4:
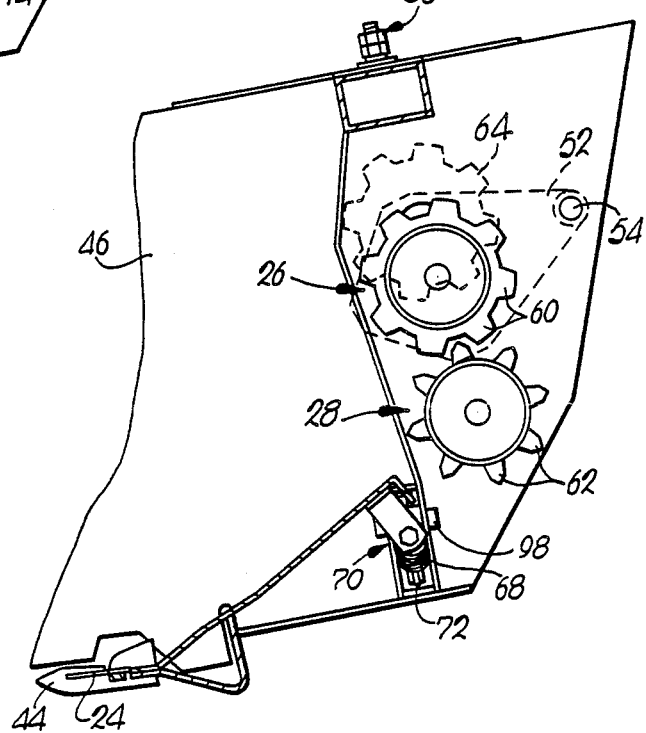
FIG. 4 is a side sectional view of the crop conditioner illustrating the relationship between the upper and lower rolls of the conditioner in two different positions of the upper roll.

A rotatable reel 20 is disposed along the front end of the windrowing apparatus and includes flaps or tines 22 which pull crop material into the apparatus past a reciprocating sickle bar 24, shown in FIG. 4, and on toward a crop conditioner which includes a pair of horizontally disposed rotatable rolls 26, 28, again shown in FIG. 4. During normal operation of the conditioner, as crop material passes through the rolls 26, 28, the stems of the material are fractured by the rolls thus permitting fluid to escape from the stems in order to augment drying. As shown in FIG. 1, a forming shield 30 is provided at the rear end of the apparatus to windrow the crop material leaving the apparatus.

Figure 2:
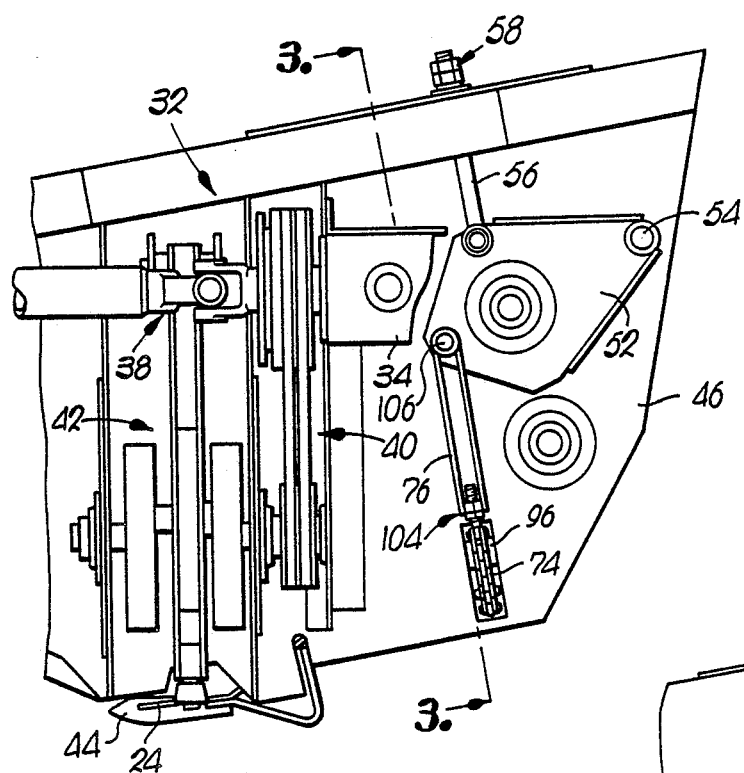
FIG. 2 is a sectional side view, partially cut away, of the drive assembly of the crop cutting machine and of the crop conditioner mounting assembly.

The drive shaft 18 of the windrowing apparatus is shown in FIG. 2, as being connected with a transmission assembly 32 that provides drive to the sickle bar 24 and the rolls 26, 28 of the conditioner. The drive shaft 18 is connected through a 90-degree angle drive box 34 to a transmission mechanism 36, FIG. 3, which delivers drive to the rolls 26, 28 of the conditioner through additional shafts described below, and is connected through a U-joint 38 to a belt assembly 40 which transmits the rotational drive of the shaft 18 to a sickle drive assembly 42. Within the sickle drive assembly 42, the rotational input force of the belt assembly 40 is translated into a reciprocating drive in order to move the sickle bar 24 along a horizontal path within a guard assembly including a number of sickle guards 44, thus causing a cutting action to be carried out along the lower front edge of the windrowing apparatus.

Turning to FIG. 3, the conditioner includes frame structure 46 on which the pair of rolls are rotatably supported. A drive shaft 48, 50 extends from each of the rolls 26, 28 respectively, and is connected through the transmission mechanism 36 and 90-degree drive box 34 to the drive shaft 18 of the windrowing apparatus. The lower roll 28 is preferably formed of metal and is mounted directly on the frame structure 46 for rotation about an axis which remains fixed relative to the frame structure 46. The upper roll 26, on the other hand, is preferably formed of a resilient material such as rubber and is supported in a mounting assembly including a pair of mounting plates 52 which not only permit rotational movement of the roll 26 about its own axis of rotation, but which also permit pivotal movement of the roll 26 about a pivot axis which is parallel to the axes of the rolls 26, 28.

As shown in FIG. 2, each mounting plate 52 includes a pivot axis 54 spaced from the axes of rotation of the rolls 26, 28. In addition, an adjustable stop mechanism is connected to each plate and includes a threaded shaft 56 extending through the frame structure 46 when the mounting plate 52 pivots toward the lower roll 28 by a predetermined amount. By setting the lock nut assembly 58 at the desired location on the threaded shaft 56, it is possible to set the minimum gap width between the rolls at the lowermost position of the upper roll.

In the preferred embodiment, when the upper roll, 26 is in its lower most position, ribs 60, 62 provided on the rolls 26, 28 are interposed without actually being in contact with one another, and the gap width is defined as the distance between the outer circumference of the ribs of one of the rolls and the opposing circumferential surface of the grooves formed between the ribs of the other roll. When the upper roll 26 and mounting plates 52 are pivoted upward toward a position away from the lower roll, the threaded shaft 56 of the stop assembly slides freely relative to the frame structure 46 permitting the upper roll 28 to move toward a position such as that shown by the dashed line 64 in FIG. 4.

The mounting assembly includes two substantially identical sub-assemblies 66, one of which is illustrated in FIG. 5. As shown in the figure, in addition to a mounting plate 52, each sub-assembly 66 also includes a spring 68 connected at one end through an adjustable fitting 70 to the frame structure 46 and connected at the other end to a cam plate 72. The cam plate, in turn, is connected through a chain 74 to a U-shaped link 76 which is coupled to the mounting plate 52. Thus, the spring 68 acts through the cam plate 72, chain 74 and U-shaped link 76 to bias the mounting plate 52 and the upper roll 26 in a direction generally toward the lower roll 28.

The connection between each spring 68 and the frame structure 46 is illustrated in FIG. 3, and includes a threaded shaft 78 having a head at one end and being threadedly received in the spring 68 at the other end. A pair of nuts 80 forming a lock nut arrangement are provided adjacent the end of the shaft received in the spring for locking the thread ed shaft 78 relative to the spring 68 once the shaft 78 is threaded into the spring by a desired amount.

Although two springs are illustrated as being provided in the preferred embodiment, it is possible to employ a large plurality of springs, connected either in series or parallel, between the cam plate and the frame. Further, instead of fastening the springs to the frame, the springs could be connected to each other, or a single spring could be provided between the two cam plates.

The illustrated embodiment is preferred in light of the construction of the inventive arrangement which requires less spring pressure than the conventional devices in which a single large spring was employed to exert a substantially uniform pressure on the rolls. Thus, the use of two relatively small and inexpensive springs is permitted even though the forces in the springs build up quickly during elongation of the springs, due to the interpositioning of the cam plate between the springs and the mounting plates.

As shown in FIGS. 6 and 7, the opposite end of each spring 68 is provided with a hook 82 which cooperates with a hook 84 of a coupling 86 extending between the spring 68 and the cam plate 72. The coupling 86 further includes a bent end portion 88, remote from the hook 84, which fits through a hole 90 of the cam plate 72 and is held in place by a cotter pin 92. The cam plate 72 is an eccentric plate element having an opening or groove 94 at one end thereof which receives a bearing sleeve 96. The sleeve 96 is in turn rotatably supported on a mounting pin 98 of the frame structure 46 which defines the axis of rotation of the cam plate 72 and which is spaced from the hole 90 in which the coupling 86 is fitted.

In addition to having the first hole 90, the plate 72 is also provided with a second hole 100 for permitting connection of the cam plate 72 with the chain 74, and a profiled edge 102 extending between the second hole 100 and the axis of rotation of the cam plate 72 on which the chain 74 rests when the cam plate 72 is in the position shown in FIGS. 3 and 6. The chain 74 is connected through a coupling 104 having an adjustable length to the U-shaped link 76 which is in turn supported on the mounting plate 52 by a pin 106. In order to permit limited freedom of movement of the link 76 relative to the pin 106, a bushing (not shown) is provided on the pin 106 which provides play between the link 76 and a nut 108 which retains the link 76 on the pin 106.

The mounting assembly is constructed in such a way that the amount of force that must be exerted on the upper roll 26 in order to overcome the effect of the springs 68 is altered by the movement of the cam plates 72 about their axes of rotation. This alteration is partially caused by a variation in the length of a first moment arm defined between the axis of rotation of each cam and the line along which the spring 68 acts on the cam plate 72. For example, as shown in FIG. 6, the cam plate 72 is in a first position corresponding to the lowermost position of the upper roller 26 and the first moment arm extends in a generally vertical direction between the axis of rotation of the cam plate 72 and a substantially horizontal line passing through the first hole 90.

When the cam plate 72 has moved to a second position, shown in FIG. 8, corresponding to an intermediate position of the upper roll 26, the first moment arm, extending between the dot-dash line 110 and the axis of rotation of the cam plate 72, is somewhat longer than the first moment arm defined in the first position of the cam plate 72. Because of this increase in the length of the first moment arm, the amount of upward force that must be exerted on the upper roll 26 in order to overcome the spring force is greater than the force necessary when the cam plate 72 is in the first position.

A third position of the cam plate 72 is illustrated in FIG. 9, and corresponds to an extreme raised position of the upper roll 26 at which a large gap exists between the rolls 26, 28. In this third position, the first moment arm is very short relative to the first moment arm in the other two positions discussed. Thus, only a relatively small upward force is necessary to overcome the spring force, and the mounting plates 52 experience little if any biasing toward the lower roll 28.

In addition to providing the first hole 90 on the cam plate 72 at a position that provides the effect discussed above on the amount of force necessary to overcome the spring force, the second hole 00 is also positioned in such a way as to effect the force with which the upper roll 26 must be pushed upward in order to overcome the action of the spring 68. For example, returning to FIG. 6, a second moment arm is defined by the perpendicular distance between the axis of rotation of the cam plate 72 and the longitudinal axis of the straight portion of the chain 74 extending between mounting plate 52 and the cam plate 72. In other words, the second moment arm extends between the axis of rotation of the cam plate 72 and a line extending in a direction tangent to the profiled edge 102 of the cam plate 72 at the uppermost point on the cam plate at which the chain 74 contacts the edge 102. Thus, as can be seen from FIG. 6, the second moment arm is very short in the first position of the cam plate 72 causing an increase in the amount of force necessary to overcome the spring force in order to lift the upper roll 26.

During the initial rotation of the cam plate 72 in a clockwise direction as shown in FIG. 6, the length of the second moment arm remains unchanged. This result occurs due to the design of the edge 102 of the cam plate which is angled relative to the axis of rotation of the plate to such a degree that the chain 74 engages the edge of the plate at the same point until the cam plate has rotated through a predetermined angle. Thereafter, the chain 74 lifts away from the edge 102 as further rotation of the cam plate 72 occurs and the length of the moment arm increases. This result can be seen from measuring the distance between the dotdash line 112 and the axis of rotation of the cam plate 72 in FIGS. 8 and 9.

Three different variations in the operation of the crop conditioner typically may arise and are discussed below. These variations include a first situation during which the upper roll 26 is resting in its lowermost closed position and a layer of crop material is passing between the rotating rolls 26, 28; a second situation in which the upper roll 26 is raised off of the stop by a small amount, but is close enough to the lower roll 28 that conditioning of crop material passing between the rolls 26, 28 is still being carried out; and a third situation during which the upper roll 26 is distanced from the lower roll 28 by an amount large enough to suggest that little or no conditioning of crop material is being carried out.

During normal operation of the crop conditioner, the upper roll 26 is retained in its lowermost position, with the stops 58 resting against the frame structure 46 as shown in FIG. 3, by the biasing force of the mounting assembly. Crop material swept into the windrowing apparatus is cut by the sickle bar 24 and is directed into the gap between the rolls 26, 28 where it is subjected to the fracturing action of the interposed ribs 60, 62 on the rolls 26, 28. Typically, a mat of material having a thickness of less than about 5 mm is continuously passed between the rolls across the width of the conditioner and is conditioned while the upper roll 26 remains in the lowermost position. After the material has passed between the rolls, it is windrowed by the skirt 30 at the rear of the apparatus and falls onto the ground to await a baling machine or some other piece of processing equipment.

Although the thickness of the mat passing through the rolls typically falls within a narrow range of thicknesses, it is possible that a mat having a relatively large thickness compared to the gap width between the ribs 60, 62 of the rolls 26, 28 may pass into the conditioner. For example, where a dense region of crop material is encountered or where crop material having large diameter stems is being cut, it may be necessary to increase the width of the gap between the rolls 26, 28 in order to permit conditioning to be carried out.

In this situation, the crop material pushes upward on the upper roll 26 against the action of the springs 68 acting through the cam plates 72, and causes the upper roll 26 to pivot away from the lower roll 28 to a position intermediate the positions shown in FIGS. 3 and 5. Because of the arrangement employed in the mounting assembly, a biasing force is continuously exerted on the mounting plate 52 during movement of the upper roll 26 between the lowermost position and the intermediate position. This biasing force retains downward pressure on the upper roll to ensure that the roll 26 is pressing down on the crop material passing between the rolls 26, 28 and is conditioning the material.

At times during operation of the apparatus, it occurs that mats of material having a large localized thickness, sometimes called slugs, are turned up by the apparatus. For example, such an occurrence may be the result of a sickle guard 44 hitting a mound of soil and unearthing a large clump of crop material and soil. This slug of material, when it reaches the gap between the rolls 26, 28, causes the upper roll 26 to pivot against the action of the springs 68 away from the lower roll 28 in order to receive the slug. When this pivoting occurs, the width of th gap between the rolls increases to a size at which it is very unlikely that proper conditioning of the remaining mat of crop material across the width of the rolls is being carried out. Therefore, the mounting assembly provides for the release of the slug by reducing the biasing force acting on the mounting plates 52, thus permitting the slug to push the rolls 26, 28 apart far enough to pass through the gap.

As can be understood from the above-description, by providing the mounting assembly of the preferred embodiment, the upper roll 26 is biased toward the lower roll 28 while spaced from the lower roll by an amount small enough to permit proper conditioning of the material passing through the rolls, and the biasing force on the upper roll 26 is reduced or removed when the upper roll moves away from the lower roll by an amount sufficient to render the rolls substantially useless in conditioning the crop material.

Figure 10:
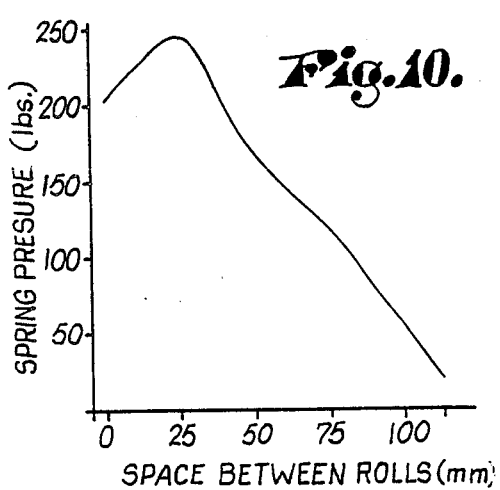
FIG. 10 is a graph illustrating the change in force experienced by the mounting plate at different positions of the upper roll relative to the lower roll.

The amount of biasing force exerted on the mounting plates 52 is shown in FIG. 10 for the different gap widths that may exist between the rolls 26, 28. From the figure, it may be seen that while the upper roll is positioned to define a gap width of about 30 mm or less, a force of more than 200 lbs. is necessary to overcome the biasing force of the spring. This result is based upon the use of springs having a spring rate of approximately 56 pounds per inch. However, as the gap width increases past about 25 mm, the force necessary to overcome the biasing force of the springs 68 drops off in such a way that, beyond a gap width of about 30 mm, only a relatively small upward force on the upper roll 26 is necessary to overcome the biasing force. By this construction, the above-mentioned variations in operation of the conditioner are dealt with in an acceptable manner.

Although no universal maximum gap width exists at which conditioning is considered as being still possible, the present inventors have found that it is necessary to provide biasing of the upper roll 26 while the width of the gap is less than about 30 mm. Beyond this width, it is typical that conditioning is not being carried out and that, very likely, a slug of material has entered the gap and threatens to lock up the rolls unless the grip on the slug is released and the slug permitted to pass. However, in a conditioner for use with materials having an increased stem thickness, it is possible to construct the mounting assembly in such a way that the biasing force drops off at any desired gap width. The important consideration is that a biasing force be provided to the upper roll while the roll is most likely to be properly conditioning crop material and that the biasing force be reduced when the upper roll is in a position suggesting the presence of a slug in order to expedite passage of the slug through the gap.

Although the present invention has been described with reference to the above-described preferred embodiment, it is understood that substitutions may be made and equivalents employed herein without departing from the scope of the invention as recited in the claims.

What is claimed is:

1. In a crop conditioner having a frame and first and second rolls each rotatable about an axis of rotation, a mounting assembly for the first roll including a sub-assembly at each end of the first roll, each sub-assembly comprising:

a mounting plate rotatably supporting one end of the first roll and being supported on the frame for pivotal movement about a pivot axis which is generally parallel to and displaced from the axis of rotation of the first roll such that the axis of rotation of the first roll is movable relative to the axis of rotation of the second roll between a first position, a second position and a third position, the second and third positions of the first roll being progressively farther away from the axis of rotation of the second roll than the first position;

biasing means for exerting a biasing force on the mounting plate and the first roll which acts in a direction generally toward the second roll, the biasing force having a magnitude which is less when the first roll is located between the second and third positions than when the first roll is located between the first and second positions.

2. The mounting assembly according to claim 1, wherein the biasing means of each sub-assembly includes a spring separate from the spring of the other sub-assembly.

3. The mounting assembly according to claim 1, wherein in each sub-assembly, the biasing means includes spring means for generating a spring force and force-transmitting means for transmitting the spring force to the mounting plate, the force-transmitting means including force-reduction means for reducing the biasing force transmitted by the transmitting means to the mounting plate when the first roll is located between the second and third positions.

4. The mounting assembly according to claim 3, wherein in each sub-assembly, the force-transmitting means includes a cam plate having an axis of rotation and spring-connection means for connecting the cam plate to the spring means at a position spaced from the axis of rotation of the cam, the force-transmitting means further including mounting plate connection means for connecting the cam plate to the mounting plate.

5. The mounting assembly according to claim 4, wherein in each sub-assembly, the mounting plate connection means includes a tension force transmitting member.

6. The mounting assembly according to claim 4, wherein in each sub-assembly, the mounting plate connection means includes a chain having a plurality of chain link elements.

7. The mounting assembly according to claim 4, further comprising means on each subassembly for adjusting the length of the mounting plate connection means.

8. The mounting assembly according to claim 4, wherein in each sub-assembly, the spring means includes a spring having one end connected to the frame and another end connected with the cam plate, each sub-assembly further comprising means for adjusting the spring force exerted by the spring at any given position of the first roll.

9. The mounting apparatus according to claim 3, wherein in each sub-assembly, the force-reduction means includes a cam plate having an axis of rotation and spring-connection means for connecting the cam plate to the spring means at a position spaced from the axis of rotation of the cam plate, the spaced position of the spring-connection means defining a moment arm between the axis of rotation of the cam plate and the line along which the spring pulls on the cam plate, the moment arm having a length that decreases during movement of the first roll away from the second roll between the second and third positions.

10. The mounting apparatus according to claim 3, wherein in each sub-assembly, the force-transmitting means includes a cam plate having an axis of rotation and mounting plate connection means for connecting the cam plate to the mounting plate at a position spaced from the axis of rotation of the cam plate, a moment arm being defined between the mounting plate connection means and the axis of rotation of the cam plate, the moment arm having a length which increases as the first roll moves away from the second roll between the second and third positions.

11. The mounting assembly according to claim 1, wherein each sub-assembly further comprises means for limiting movement of the first roll toward the second roll past a predetermined minimum separation distance.

12. The mounting assembly according to claim 11, wherein the movement limiting means includes means for adjusting the predetermined minimum separation distance.

13. The mounting apparatus according to claim 1, wherein the magnitude of the biasing force decreases as the first roll moves away from the second roll beyond the second position.

14. In a crop conditioner having a frame and first and second rolls each rotatable about an axis of rotation, a mounting assembly for the first roll including a sub-assembly at each end of the first roll, each sub-assembly comprising:

a mounting plate rotatably supporting one end of the first roll and being supported on the frame for pivotal movement about a pivot axis which is generally parallel to and displaced from the axis of rotation of the first roll such that the axis of rotation of the first roll is movable relative to the axis of rotation of the second roll between a first position, a second position and a third position, the second and third positions of the first roll being progressively farther away from the axis of rotation of the second roll than the first position;

biasing means for exerting a biasing force on the mounting plate and the first roll which acts in a direction generally toward the second roll, the biasing means including force-generating means for generating a biasing force and force-transmitting means being connected between the force-generating means and the mounting plate and having an axis about which the force-transmitting means is pivotable, the force-transmitting means further including force-reduction means for reducing the force transmitted by the transmitting means to the mounting plate when the first roll moves away from the second roll beyond the second position.

* * * * *